United States Patent [19]
Ode et al.

[11] 3,775,247

[45] Nov. 27, 1973

[54] CONTROL ROD DRIVE FOR A WATER-COOLED NUCLEAR REACTOR

[75] Inventors: Bengt Ode; Zntti Suvanto; Lars Tornblom, all of Vasteras, Sweden

[73] Assignee: AB Asea-Atom, Vasteras, Sweden

[22] Filed: June 3, 1971

[21] Appl. No.: 149,558

[30] Foreign Application Priority Data
June 18, 1970 Sweden.............................. 8474/70

[52] U.S. Cl. ................................................. 176/36
[51] Int. Cl. ............................................. G21c 7/12
[58] Field of Search ...................................... 176/36

[56] References Cited
UNITED STATES PATENTS

| | | | |
|---|---|---|---|
| 3,031,397 | 4/1962 | Fortescue et al. ................ | 176/36 R |
| 3,162,579 | 12/1964 | Thomas et al. .................... | 176/36 R |
| 3,089,839 | 5/1963 | Hawke et al. ...................... | 176/36 R |
| 3,020,888 | 2/1962 | Braun................................ | 176/36 R |

*Primary Examiner*—Reuben Epstein
*Attorney*—Jennings Bailey, Jr.

[57] ABSTRACT

A control rod drive for a water-cooled nuclear reactor includes a double-walled cylinder with an opening at the bottom from the space between the walls into the interior. A piston slidable in the interior is connected to the control rod. A motor driven spindle carries a nut which can be moved upwardly into engagement with the piston to raise the control rod for normal control purposes. A source of gas under pressure is connected through a scram valve to the top of the space between the walls, for pressing water into the cylinder to raise the piston and control rod quickly in an emergency.

5 Claims, 2 Drawing Figures

CONTROL ROD DRIVE FOR A WATER-COOLED NUCLEAR REACTOR

BACKGROUND OF THE INVENTION

1. Field of the Invention

The present invention relates to a control rod drive of the type having an hydraulically operated drive means for lifting the control rod into the reactor core during a scram operation.

2. The Prior Art

The reaction in the reactor must be quickly stopped in a number of different emergency situations, for example if the level of the neutron flux is too high, for too rapid an increase of the neutron flux and for too high pressure in the reactor. A method of performing such a scram which is becoming increasingly popular is to push in the normal control rods of the reactor rapidly into the core of the reactor. In order at the same time to be able to attain high precision for the normal movements of the control rods and a rapid insertion for scram, a control rod drive is normally used which has a separate drive means for each of these functions. A mechanical drive means with a motor-driven screw-nut transmission is preferably used for normal movement of the control rods, and a hydraulic drive means with a hollow piston rod surrounding the screw is used for scram insertion. The piston rod is provided at the top with a narrow passage for a small crude-repulsion flux which prevents active sludge from falling down and collecting in the drive means. However, if a large quantity of pressurized water is supplied, the piston rod pushes the control rods into the core in spite of the flow passage and quite irrespective of the mechanical drive means. Control rod drives of this type are known, for example, through the Swedish Pat. No. 314,749.

A hydraulic system for the function of the scram insertion has been previously proposed which includes a water tank, a nitrogen gas tank, a dumping tank for nitrogen gas and a store of nitrogen gas. The nitrogen gas tank and the water tank communicate freely with each other so that the pressure of the nitrogen gas is directly affected by the water level in the water tank. A pressure-regulating system makes it certain that the pressure is permanently kept at a certain value, for example 24 bar, above the pressure prevailing in the reactor at any given moment. Thus, if the reactor pressure drops, some of the nitrogen gas is dumped from the nitrogen gas tank to the dumping tank and, if the reactor pressure increases, nitrogen gas is led from the nitrogen store to the nitrogen tank. A compressor compresses the nitrogen gas in the dumping tank and returns it to the nitrogen gas store. This known system is not only expensive, it also requires a great deal of space because of the many tanks and normally, therefore, it cannot be located inside the containment surrounding the reactor. These drawbacks are alleviated by giving the control rod drive the form of a piston which is raised for rapid insertion of the control rod by water contained between the walls of and within a double-walled cylinder. The space between the walls is connected at the bottom to the interior of the cylinder and the top of the space is connected to a source of gas under pressure which can be released by a scram valve to push the water downwardly and into the interior of the cylinder.

The advantages of the invention are particularly evident in a reactor having circulation pumps inside the reactor, since in this case large building spaces outside the containment vessel may be eliminated.

BRIEF DESCRIPTION OF THE DRAWINGS

In the following the invention will be described more closely with reference to the accompanying drawings.

DESCRIPTION OF THE PREFERRED EMBODIMENTS

Figure 1:
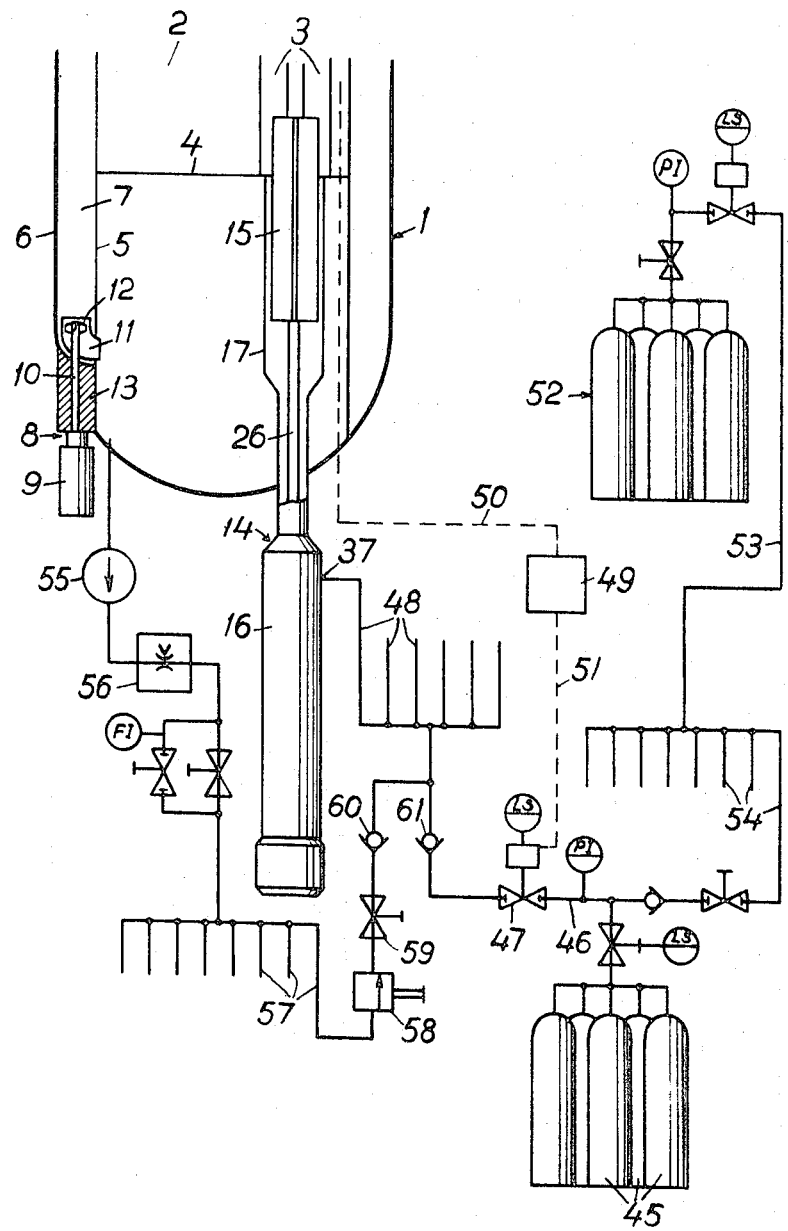
FIG. 1 shows schematically the lower part of a reactor provided with a scram system, in which the control rod drive according to the invention is included.

The reactor 1 shown in FIG. 1 is a BWR. The reactor core 2 is constructed conventionally of fuel rods held together in fuel assemblies 3, only two of which have been indicated. The fuel assemblies are supported by a core bottom 4 and the core is surrounded by a moderator tank 5 which in turn is surrounded by the reactor pressure vessel 6 in such a way that a vertical, tubular gap 7 is formed between them. In the lower part of the gap a plurality of circulation pumps 8 are arranged inside the reactor, only one of these pumps being shown. Each pump comprises a motor 9 arranged outside the reactor pressure vessel, a vertical pump shaft 10, a pump housing 11 with curved through-flow having its inlet in the gap 7 and outlet in the lower part of the moderator tank 5 below the core bottom 4, and an impeller 12 located inside the pump housing and driven by the pump shaft. The reactor pressure vessel 6 is locally reinforced in the area 13 near the area penetrated by the pump shaft. A plurality of vertical control drives 14, only one of which is shown, penetrate the bottom part of the reactor vessel 6 inside the ring of circulation pumps. Each control drive consists of a control rod 15 and a drive means 16 for the control rod. Below the core 2 the control rod runs in a control rod guide tube 17 provided at the top with an assembly plate for four fuel assemblies 3 arranged in a square, between which is a cruciform gap. The control rod 15, which also has cruciform cross-section, can be inserted into this gap. However, the control rods may also be of the so-called finger type and operate inside the fuel assemblies. As can be seen from FIG. 2 the drive means 16 is of mechanical hydraulic, two function type, that is it has a mechanical drive means for normal movement of the control rod 15 and a hydraulic driving system for rapid insertion of the control rod into the reactor core 2. Its main parts are: an electric motor 18 with gear drive, a screw 19, a nut 20, a piston rod 21 and a double-walled housing 22. The nut 20 has a threaded insert, not shown, of axially pre-stressed graphite, and is secured against turning by means of graphite lugs 23, one of which is shown, which run on axial guides 27, one being shown, arranged in the housing 22. It thus moves axially when the motor 18 rotates the screw 19 by way of a coupling 28. The piston rod 21 is tubular and surrounds the screw 19. It is provided at the bottom with a head 24 having guides 31 (one being shown) engaging against said guides 27 and spring-loaded (29), mechanical pawls 30, one of which is shown. The piston rod 21 passes through a seal 25 arranged in the upper end of the drive housing 22 and at the top is joined directly to the control rod 15 or indirectly by means of an operating rod 26 (FIG. 1).

The drive housing 22 consists of an outer casing 32, an inner casing 33 and a bottom plate 34. The casings 32 and 33 are tubular and the outer casing 32 has an inner diameter which is greater than the outer diameter of the inner housing 33. The drive housing 22 is thus double-walled so that between its walls 32 and 33 there is a vertical, tubular gap 35. The gap 35 is substantially sealed at the top by means of a seal 36 held in place by the inner casing 33, and is sealed at the bottom by means of a seal, not shown, applied between the bottom plate 34 and the outer casing 32 or between the outer and the inner casings, and is intended normally to contain substantially all the driving water required to insert the control rods rapidly. The gap 35 is also provided at the top with an inlet 37 for driving gas under high pressure and is joined at the bottom to a space enclosed by the inner casing 33 by means of a plurality of throttled flow passages 38 in which a pressure reduction takes place. The inlet 37 for driving gas is passed out through the outer casing 32 and, as is clear from FIG. 1, is connected to a pressurized gas conduit which normally contains a small quantity of water which mixes with the driving water enclosed in the gap 35 when scram is initiated.

The screw 19 is provided at the top with a guide 43 which supports the upper end of the screw against the inside of the piston rod 21. At the bottom the screw passes through the bottom plate 34 and a stuffing box 39 arranged in this plate to the coupling 28. The outer casing 32 is provided at the bottom with a flange 40 and the bottom plate 34 is provided with a counter flange 41. On the lower side of the bottom plate 34 the motor 18 is attached and on the upper side the inner casing 33 is attached. Thus, except for the outer casing 32, the entire drive means forms a unit which can be inserted into the outer casing 32 and secured to this casing by means of screw 42, one of which is shown. The outer casing 32 in the embodiment shown in FIG. 2 consists of a control drive connection piece 32 permanently applied on the reactor pressure vessel 6.

Normally the piston rod 21 rests on the nut 20 and thus moves with this nut. Th pawls 30 are thus inoperative as they are held in. Upon scram insertion the piston rod 21 is activated by the hydraulic pressure so that, together with the control rod 15, it is pushed up and leaves its position on the nut 20. The pawls 30 on the piston rod are thus released and engage against axial racks 44 arranged inside the inner casing 33, one of these racks being shown. This prevents the control rod 15 from leaving the core 2 again when the hydraulic pressure drops. However, continued movement to a top position is possible since the blocks then slide over the teeth on the racks. Upon an emergency stop the electric motors 18 are started, whereupon the nut 20 is screwed up into top position. When the weight of the control rod 15 again rests on the nut 20 the pawls are automatically released after which the downward operation can start.

In the case shown in FIG. 1 the emergency system is constructed to serve eight groups of six control drives each, which are substantially uniformly distributed across the cross section of the core. Of course the groups may be larger and smaller, but safety analysis and economic considerations have shown that the group preferably consists of four to seven control drives. The reactor will therefore be provided with a plurality of such groups which operate in parallel, independently of each other. Of course, the number of groups may also vary and a BWR of 750 MW may have, for example twelve groups, each having six or seven control drives.

In each group there is a pressure gas source as well as valves and conduits. The pressure gas source may comprise a gas container or, as shown, a plurality of gas bottles 45 in which the gas is kept at a pressure of 120 bar, for example. The gas can be led from the gas bottles through a main conduit 46 belonging to the group, having a scram valve 47 which is normally shut and also through branch conduits 48 to the gas inlet 37 of the control drives forming the group. The scram valve is opened at a signal from a control unit 49 of conventional type. On the basis of the measured values coming from various parts of the nuclear power station, the control unit determines whether scram should occur or not. As examples of reasons causing scram may be mentioned; if the level of the neutron flux is too high, if the neutron flux increases too rapidly, if the level of the water in the reactor is too low, if the pressure in the reactor is too high, if the pressure in the turbine condensor is too high, if the valves have closed in the main steam conduits to the turbine, if the radiation level in the chimney is too high, if the power supply ceases. A signal conduit 50 is merely indicated in FIG. 1 from a probe to measure the neutron flux in the core connected to the control unit and a signal conduit 51 from the control unit to the scram valve. Both the scram valve and the gas bottles are preferably located outside the containment vessel. The branch conduits 48 may be provided if desired with non-return valves, not shown, which permit flow to the drive means but prevent flow therefrom.

In all the groups there is a gas store 52 with a pressure of, for example, 200 bar to refil the gas bottles 45. A main conduit 53 leads from the gas store, dividing into a number of branch conduits 54, one for each group.

Figure 2:
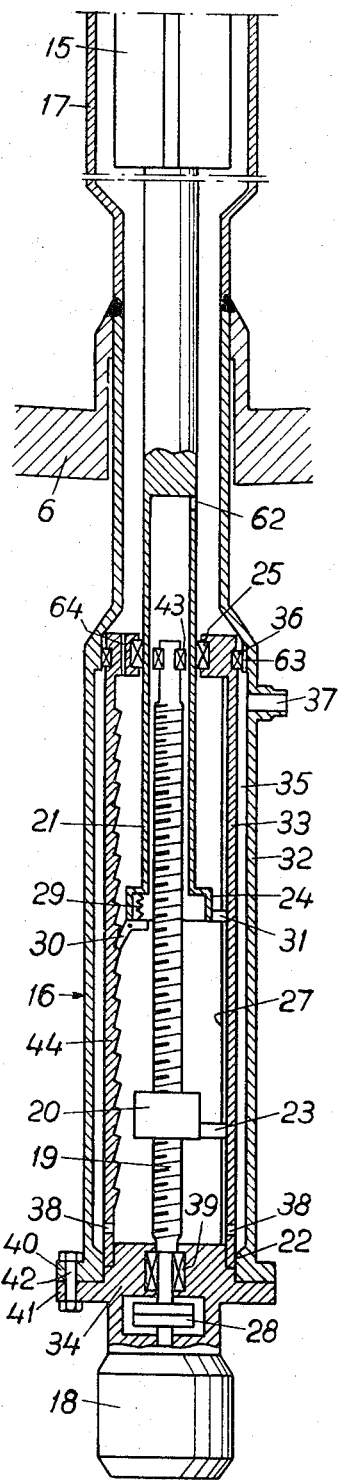
FIG. 2 shows schematically the control rod drive in axial section.

In order to to prevent a temperature shock at scram and also to prevent impurities in the form of active sludge in the moderator from falling down and collecting in the drive means, a small flow of water is taken out of the reactor and pressurized by means of a pump 55. This is then led through a flow regulator 56 into a number of branch conduits 57, one to each group, and then on to the main conduit 46 at a point between the scram valve 47 and the branch conduits 48. Each branch conduit 57 for water has a regulating valve 58 and a closing valve 59 which is normally open. Furthermore, in each branch conduit 57 for water and in each main conduit 46 there is a non-return valve 60, 61, respectively, which prevents gas from penetrating into the water system or water from penetrating into the gas system, respectively, However, small quantities of water and gas which find their way past the non-return valves can be led away through drainage conduits, not shown. When the water flow has reached the main conduit 46 it is carried further through the branch conduits 48 and into the drive means 16 through the inlet 37 for pressurized gas. Once inside the drive means, most of the water flow passes down through the gap 35, as can be seen in FIG. 2, passes through the openings 38 into the inner drive housing 33 and most of it is then carried up through the hollow piston rod 21 to the top of this rod and then out through a narrow flow passage 62 to the upper part of the control drive connection piece 32 or the lower part of the control rod guide tube 17 and then up through the reactor. A small quantity of the water flows from the upper part of the gap 35 past the seal 36 and directly up into the upper part of the control drive connection piece either through a specially arranged narrow flow passage 63 at the top of the gap or directly past the seal 36 if this has been made intentionally not quite tight. In the same way a small quantity of water flows past the seal 25 into the upper part of the inner housing 33, either through a specially arranged narrow flow passage 64 in the top of the housing 33 or directly past the seal 25 if this has been made intentionally not quite tight. The normal water flow, the narrow flow passages 62, 63 and 64 and the rapid insertion process are adapted to each other so that, when the pressurized gas presses in the driving water volume in the inner housing 33, the piston rod 21 is lifted from its postion on the nut 20 and pushes the control rod 15 completely into the core in spite of the narrow flow passages 62-64, whereas the normal water flow cannot lift the piston rod from the nut but instead leaks out through the narrow flow passages to the inside of the reactor.

The volume of driving water is such that it is sufficient to push the control rod to the top. In the normal way the piston rod 21 and the upper part of the inner housing 33 have complementary members, not shown, which together form a hydraulic end position brake. At the completion of the pushing in process the gap 35 is practically emptied of water but the pressurized gas supplied continues to expand and forces its way into the inner housing 33. At the same time that the drive means is now filled with fresh water through the pump 55 and branch conduit 57, the gas leaves the drive means and flows into the reactor. The gap 35 is thus emptied of gas through the narrow flow passage 63, the space enclosed by the inner housing 33 through the narrow flow passage 64 and the space inside the hollow piston 21 through the narrow flow passage 62.

It is usual to use nitrogen gas to pressurize the driving water in the scram system. Previously the systems have been designed in such a way that the nitrogen gas could not enter the reactor since it would then react with the free oxygen in the reactor and be absorbed into the coolant of the reactor and form nitric acid. The formation of nitric acid is counteracted if a sufficiently large quantity of hydrogen gas is introduced into the reactor at the same time as the nitrogen gas, preferably mixed with it. The quantity of hydrogen which can be supplied is limited by the condition that the mixture must not be combustible in air. A nitrogen gas/hydrogen gas mixture is preferably used in which the hydrogen content is in the order of 5 percent.

Assuming that the reactor is of direct cycle type, the driving gas flows with the steam to a turbine condensor and is then drawn off by the normal ejector vacuum pumps of the condensor.

The invention is not limited to the embodiment described above and shown in the drawings although this is preferred. It also covers a purely emergency stop drive means which is used only for scram and therefore has no drive means for normal operation of the control rod, which in this case consists of an emergency rod.

We claim:

1. Control rod drive for a water cooled nuclear reactor (1), said drive (16) comprising a drive means (21) operated by a volume of pressurized water to insert the control rod (15) into the core (2) of a reactor (1), and a housing (22) which surrounds the drive means (21) and is adapted to be connected in a vertical position to the lower side of the reactor (1), in which the housing (22) is double-walled so as to provide between its walls (32 and 33) a vertical tubular gap (35) which is adapted normally to contain at least a substantial part of the water volume, means connecting said gap at its lower end to the inside of the housing (22) and to the drive means (21) for rapid introduction of water through at least one first flow passage (38) and an inlet (37) into said gap for connection to a pressure medium source (45) through a supply conduit (46,48) having a scram valve (47) which is normally shut but opened in an emergency for pressurizing the driving water, the driving water being pressurized by means of compressed gas and at least one narrow, second flow passage (62,64) arranged to connect the inside of the housing (22) with the inside of the reactor (1), and means (63) at the upper part of the gap (35) for the escape of gas from the gap (35) after an emergency shutdown.

2. Control rod drive according to claim 1, in which the escape means comprises at least one narrow, third flow passage (63) adapted to connect the upper part of the gap (35) with the inside of the reactor (1).

3. Control rod drive according to claim 1, in which the first flow passage (38) comprises a throttle for the pressurized water, and is of considerably larger cross-section than the second flow passages (62,64).

4. Control rod drive according to claim 1, in which the drive means (21) for rapid insertion comprises a piston rod (21) at least indirectly joined with the control rod (15), the outer wall (32) of the drive housing (22) comprising a drive connection piece (32) with a lower flange (40), the connection piece being fixed to the reactor (1), the inner wall (33) of the drive housing being provided at the bottom with a bottom plate (34) with a counter flange (41) which is detachably attached to the connection piece flange (40), first sealing means (36) located between the outside of the inner wall (33) and the connection piece (32) at the upper part of the inner wall (33) to seal the gap (35) against the inside of the reactor (1) and second sealing means (25) located between the inside of the inner wall (33) and the piston rod (21) at the upper part of the inner wall (33) to seal the inside of the drive housing (22) against the inside of the reactor (1).

5. Control rod drive according to claim 4, in which substantially all the parts of the drive housing (22) located inside its outer wall (32) are combined to form a unit which can be taken in and out of the drive connection piece (32).

* * * * *